J. A. REISCHMANN, Jr.
SIGNAL DEVICE.
APPLICATION FILED OCT. 2, 1916.
1,311,997.
Patented Aug. 5, 1919.
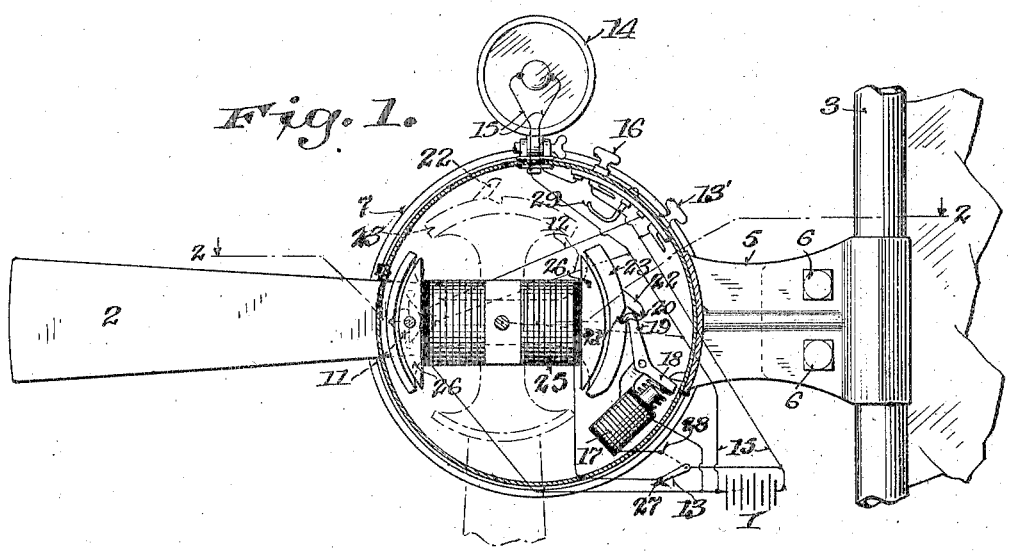
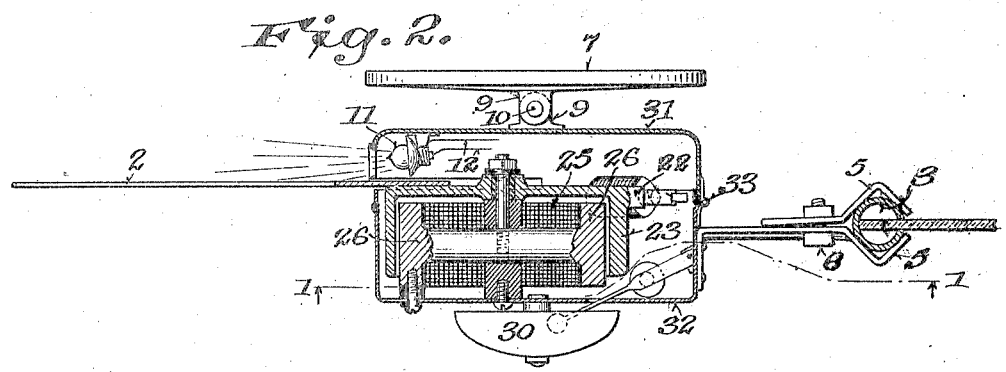
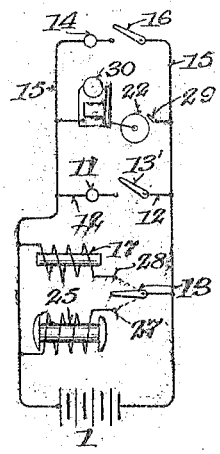
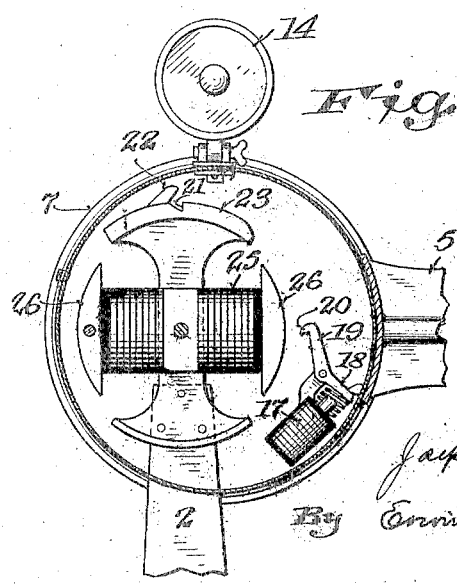

UNITED STATES PATENT OFFICE.

JOSEPH A. REISCHMANN, JR., OF MILWAUKEE, WISCONSIN.

SIGNAL DEVICE.

1,311,997.   Specification of Letters Patent.   Patented Aug. 5, 1919.

Application filed October 2, 1916.  Serial No. 123,252.

*To all whom it may concern:*

Be it known that I, JOSEPH A. REISCHMANN, Jr., a citizen of the United States, residing at the city of Milwaukee, county of Milwaukee, and State of Wisconsin, have invented new and useful Improvements in Signal Devices, of which the following is a specification.

My invention relates to improvements in signal devices for automobiles and other vehicles, and it pertains more especially to that class of signal devices which are operated by electricity, whereby an arm or other signal is brought into view by touching a button or closing an electric circuit or by any other means, also whereby a signal bell is momentarily and automatically sounded and an electric light is simultaneously produced. My invention also includes a mirror, whereby a vehicle or other object approaching from the rear may be seen without the necessity of the operator turning in his seat.

My invention is further explained by reference to the accompanying drawing, in which—

Figure 1 represents a front view of the device, part in vertical section, the same being drawn on line 1, 1 of Fig. 2.

Fig. 2 is a section showing a signal arm extended, drawn on line 2, 2 of Fig. 1.

Fig. 3 is a vertical section showing a portion of the signal arm in its lowered position, and Fig. 4 is a diagrammatic view showing the electric battery, electric wires, switches and signal bell.

Like parts are referred to by the same reference characters throughout the several views.

1 is an electric battery or other source of electrical energy. 2 is a signal arm upon which the word "Stop" or other appropriate signal may be printed. When used in connection with an automobile the signal is preferably connected with one of the side members 3 of the wind shield by brackets 5, 5 and bolts 6, 6, or in any convenient manner. 7 is a mirror which is pivotally connected with the signal inclosing chamber by lugs 9, 9 and bolt 10. The rear side of the signal arm 2 is preferably lighted, when raised to the position shown in Figs. 1 and 2, by an electric lamp 11, and said lamp is connected with the battery 1 by the wires 12, 12 and switch 13'. 14 is an electric lamp of ordinary construction, and the same is adapted to be manually connected with the battery 1 or other source of electrical energy by the wires 15, 15 as the switch 16 is closed. 17 is an electromagnet. When the switch arm 13 is moved to the dotted position shown in Fig. 1 the arm 18 is drawn down in contact with one end of the electromagnet 17, whereby the opposite arm 19 is thrown upwardly, whereby the catch 20, formed on the extreme upper end of the arm 19 is disengaged from the recess 21, when such extreme upper end is caused thereby to contact with the lug 22, whereby the armature 23 is given a quick positive movement in a circular direction upwardly from the position shown in Fig. 1 to that indicated in dotted lines in said figure, when owing to the slight excess of weight of the arm 2 over that of the armature 23 said arm 2 is caused to move downwardly from the position shown in Figs. 1 and 2 to that shown in Fig. 3. The armature 23 is provided with a notch or recess 21, as stated, for the reception of the catch 20, whereby said signal arm 2, when raised, is securely retained in its raised position. The electromagnet 25 is energized the instant the switch 13 is brought in contact with the lower terminal 27, whereby the members 26 are magnetized and cause the armature 23 to be drawn in close proximity to them. When said switch 13 is raised and moved in the opposite direction, and thereby brought in contact with the terminal 28 the position of said signal arm will be reversed and lowered to the position shown in Fig. 3, as stated. As the armature 23 is given a partial revolution in either direction on its pivotal support the lug 22 is caused to contact for a brief interval with the arm 29, whereby the electric circuit between the battery 1 and the bell 30 is closed and said bell is thereby automatically sounded for a brief interval during such contact. The rear part 31 of the inclosure 32 is secured at one side to said inclosure by the hinge 33, while the opposite side of said inclosure is provided with an ordinary catch by which such parts are connected together.

Having thus described my invention what I claim as new and desire to secure by Letters Patent, is:—

1. In a device of the described class, the combination of a signal arm, a stationary electromagnet, a pair of circular members secured to the respective ends of said electromagnet, an armature revolubly supported upon said stationary electromagnet, and adapted to revolve a partial revolution only around said electromagnet, a switch, pair of terminals connected with said switch, said armature being adapted to move said signal arm in an upward direction, and means for holding said signal arm when raised, said signal arm being moved downwardly by gravity after having been released from its holding means.

2. In a device of the described class, the combination of a signal arm, an electromagnet, a revoluble armature pivotally supported upon said electromagnet, and adapted to revolve a partial revolution around its exterior, an electric battery, electric wires communicating between said battery and said electromagnet, a switch, a pair of terminals connected with said switch, said signal arm being adapted to be moved by said revoluble armature in an upward direction as said armature performs a partial revolution around said electromagnet, a spring adapted to throw a latch into contact with one end of said armature, whereby said latch is caused to engage a notch in said revoluble armature, and thereby retain such signal arm in its raised position, and means connected with the other terminals for releasing said latch and signal arm, whereby said signal arm is adapted to drop in the opposite direction by gravity, a signal bell, and means connected with said battery for automatically closing an electric circuit between said battery and signal bell as said signal is moved in either direction.

In testimony whereof I affix my signature in the presence of two witnesses.

JOSEPH A. REISCHMANN, Jr.

Witnesses:
JAS. B. ERWIN,
ALICE J. McKERIHAN.